US012703297B2

(12) United States Patent
Weston et al.

(10) Patent No.: US 12,703,297 B2
(45) Date of Patent: Aug. 11, 2026

(54) SYSTEMS AND METHODS FOR INTELLIGENT CONTROL OF VEHICLE LIGHTING TO MITIGATE INSECT PRESENCE

(71) Applicant: Ford Global Technologies, LLC, Dearborn, MI (US)

(72) Inventors: Keith Weston, Canton, MI (US); Brendan Diamond, Naples, FL (US); Matthew Johnson, Toledo, OH (US); David Michael Russell, Ann Arbor, MI (US); Michael Alan Mcnees, Flat Rock, MI (US)

( * ) Notice: Subject to any disclaimer, the term of this patent is extended or adjusted under 35 U.S.C. 154(b) by 29 days.

(21) Appl. No.: 18/903,099

(22) Filed: Oct. 1, 2024

(65) Prior Publication Data

US 2026/0091726 A1 Apr. 2, 2026

(51) Int. Cl.
*A01M 29/16* (2011.01)
*B60Q 1/00* (2006.01)
(Continued)

(52) U.S. Cl.
CPC ........... *B60Q 1/249* (2022.05); *B60Q 1/0023* (2013.01); *B60Q 3/70* (2017.02); *G06T 7/155* (2017.01);
(Continued)

(58) Field of Classification Search
None
See application file for complete search history.

(56) References Cited

U.S. PATENT DOCUMENTS 11,653,642 B2 * 5/2023 Salter .................... G06V 20/56 367/139
11,944,085 B2 4/2024 Woo
(Continued)

FOREIGN PATENT DOCUMENTS

CN 115633429 A 1/2023
CN 116439226 A 7/2023
(Continued)

OTHER PUBLICATIONS

Elwood A. Seaman, An Insect Light Trap for Use With Auto Vehicles in the Field, https://dn790002.ca.archive.org/0/items/cbarchive_118188_aninsectlighttrapforusewithaut1945/MN_V5_N3_P079-81_text.pdf, Sep. 1945, pp. 79-81.

*Primary Examiner* — Kenneth B Wells
(74) *Attorney, Agent, or Firm* — Frank Lollo; Eversheds Sutherland (US) LLP

(57) ABSTRACT

Systems and methods for intelligent control of vehicle lights to mitigate presence of insects are provided. A vehicle may capture image data using one or more of its sensors. The image data may be of the internal cabin of the vehicle an external environment of the vehicle. The image data may be processed using a segmentation and classification algorithm to determine the presence of insects in or around the vehicle. The vehicle may additionally determine the presence of users in or around the vehicle. The vehicle may also determine the location of the insects and the users. Based on the location of the users and the insects, the vehicle may illuminate the appropriate lights of the vehicle in order to cause the insects to move away from the location of the users thereby enhancing user experience and mitigating the annoyance caused by the presence of the insects.

20 Claims, 7 Drawing Sheets

(51) Int. Cl.

| | |
|---|---|
| ***B60Q 1/24*** | (2006.01) |
| ***B60Q 3/70*** | (2017.01) |
| ***G06T 7/155*** | (2017.01) |
| ***G06T 7/194*** | (2017.01) |
| ***G06V 20/56*** | (2022.01) |
| ***G06V 20/59*** | (2022.01) |
| ***G06V 40/10*** | (2022.01) |
| ***H04W 4/46*** | (2018.01) |

(52) U.S. Cl.

CPC .............. *G06T 7/194* (2017.01); *G06V 20/56* (2022.01); *G06V 20/59* (2022.01); *G06V 40/103* (2022.01); *H04W 4/46* (2018.02)

(56) References Cited

U.S. PATENT DOCUMENTS

| | | | | |
|---|---|---|---|---|
| 2013/0083974 | A1* | 4/2013 | Tsai | G06V 10/28 382/110 |
| 2018/0027795 | A1* | 2/2018 | Janét | A01M 1/026 |
| 2018/0225518 | A1* | 8/2018 | Gu | G06F 18/23213 |
| 2020/0019765 | A1* | 1/2020 | Ampatzidis | G06N 3/0464 |
| 2020/0143202 | A1* | 5/2020 | Chellappan | G06F 18/23 |
| 2025/0124713 | A1* | 4/2025 | Parker | G06T 7/136 |

FOREIGN PATENT DOCUMENTS

| | | | |
|---|---|---|---|
| DE | 102018207715 | A1 | 11/2019 |
| KR | 20240087184 | A | 6/2024 |

* cited by examiner

SYSTEMS AND METHODS FOR INTELLIGENT CONTROL OF VEHICLE LIGHTING TO MITIGATE INSECT PRESENCE

FIELD

The present disclosure relates to the field of intelligently controlling vehicle lighting. Specifically, embodiments of the present disclosure relate to control of vehicle internal and external lights to mitigate issues caused by presence of insects/bugs in or around the vehicle.

BACKGROUND

The presence of insects in or around a vehicle can be a significant source of annoyance for users. These tiny pests can annoy drivers, causing discomfort. Additionally, insects can ruin the vehicle's interior, leaving stains or causing unpleasant odors. For passengers, especially those with insect phobias, the experience can be particularly distressing, turning a simple drive into an uncomfortable situation. Further, encountering insects near a vehicle can create several issues for users trying to get in or out of the vehicle. The sight of insects like bees, wasps, or spiders can cause anxiety, leading to hesitation or hurried movements. For those with allergies, the presence of stinging insects poses a health issue. Additionally, bugs can enter the vehicle during user entry into or exit from a vehicle, leading to further discomfort.

Conventionally people have used insect repellent sprays or air-fresheners to keep the pests away. In some cases, users may install an insect/bug screen as appropriate to allow ventilation while keeping the bugs out. Another common way to mitigate insect issues is to not park the vehicle near areas with high insect activity, like gardens or trash bins and/or inspect the vehicle for insects before getting in or out of the vehicle. However, none of these methods are comprehensive and robust enough to ensure that no insects or a minimal number of insects exist in the vicinity of the vehicle.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The present disclosure describes systems and methods for modifying a default operation of a one touch window down/up feature of a vehicle based on specific conditions detected in the vicinity of the vehicle.

Embodiments of the present disclosure provide a vehicle that includes one or more processors, one or more memory devices storing instructions and coupled to the one or more processors, and one or more sensors coupled to the one or more processors. The one or more processors are configured to execute the instructions to capture image data using the one or more sensors, generate, using the image data, foreground image data and background image data, execute a morphological operation on the image data to remove noise from the image data, execute, on the foreground and background image data, feature extraction to identify one or more insects depicted in the image data, determine a first location of the insects with respect to the vehicle, and operate a set of lights of the vehicle based on the location of the insects.

In another instance, a system is provided that includes a first vehicle and a second vehicle. Each of the first vehicle and the second vehicle includes one or more processors, one or more memory devices storing instructions and coupled to the one or more processors; and one or more sensors coupled to the one or more processors. The first vehicle and the second vehicle are configured to determine a first location of the first vehicle and determine a second location of the second vehicle. The system further determines presence of insects in the vicinity of the first vehicle and presence of a first set of users in the vicinity of the first vehicle. The system then sends, from the first vehicle to the second vehicle, a first message and the second vehicle illuminates, based on the first message, one or more external lights of the second vehicle to cause the insects to migrate towards the second vehicle.

In yet another instance, a method performed by a vehicle is provided. The method includes the vehicle capturing an image using an image sensor of the vehicle, generating, using the image, foreground image data and background image data, and executing a morphological operation on the image to remove noise from the image. The method further includes the vehicle executing, on the foreground and background image data, feature extraction to identify one or more insects depicted in the image, determining a first location of the insects with respect to the vehicle, and operating a set of lights based on the location of the insects.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

Figure 1:
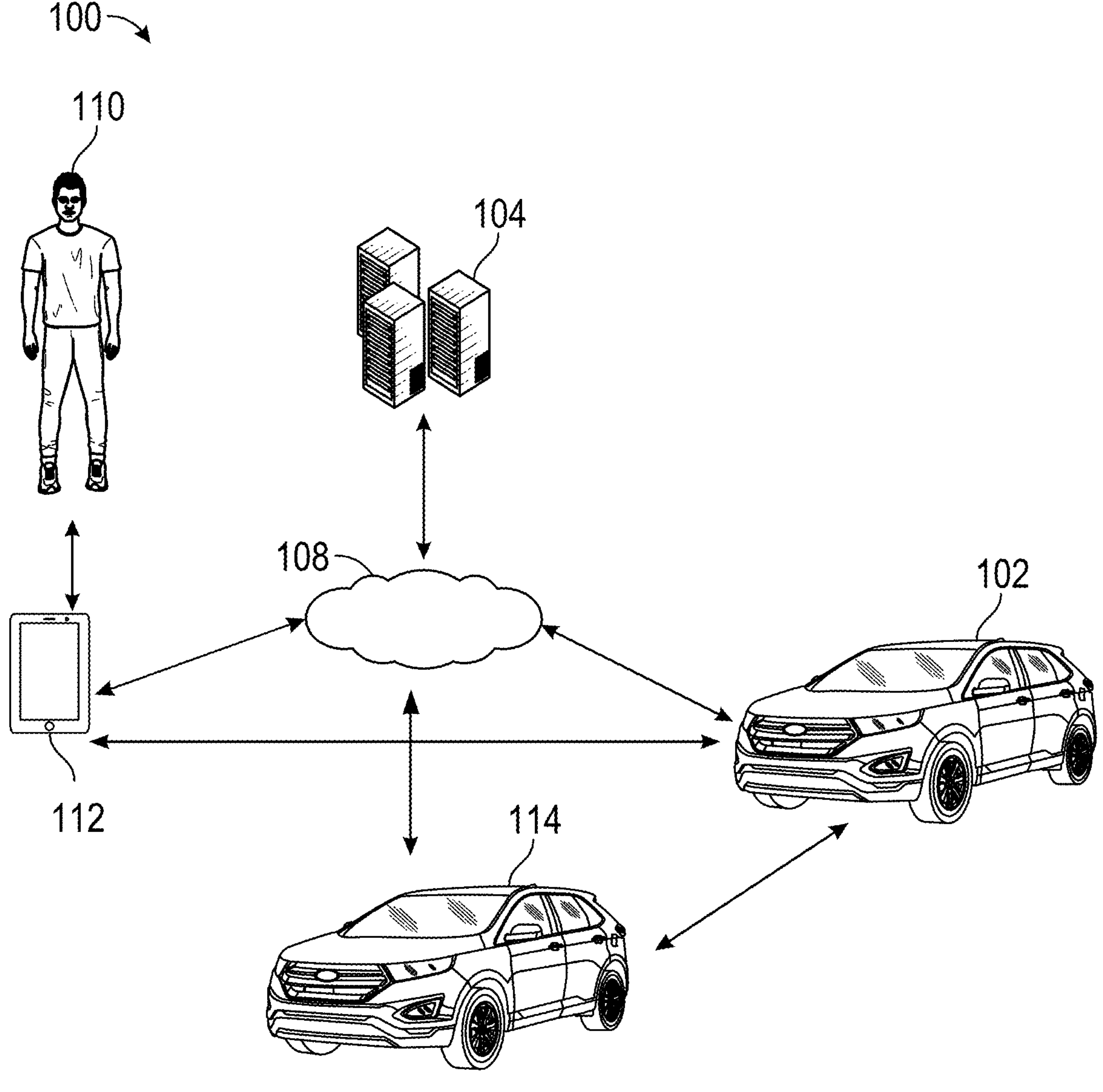
FIG. 1 illustrates an environment in which embodiments of the present disclosure can be implemented.

FIG. 1 illustrates an environment 100 in which the embodiments of the present disclosure may be implemented. The vehicles 102 and/or 114 can be any passenger or commercial vehicle such as a car, truck, tanker, bus, or the like. The environment 100 may also include a control server 104. The control server 104 may be part of a cloud-based computing infrastructure and may be associated with and/or include a Telematics Service Delivery Network (SDN) that provides digital data services to the vehicles 102 and/or 114. The two vehicles 102 and 114 may communicate directly with each other (e.g., using Vehicle-2-Vehicle (V2V) communication) without the need for any intervening entity or via the server 104 and the network 108. Details of the control server 104 are provided below with reference to FIG. 7.

The environment 100 may also include a user device 112. The user device 112 may be one of a mobile phone, a tablet, a personal computer, a smart key fob, or the like. The user device 112 may be associated with a user 110 of the vehicle 102. The user 110 may be a driver of the vehicle 102 or a passenger in the vehicle 102. The user device 112 may receive information from the vehicle 102 and/or the control server 104. The user device 112 may have a specialized application installed on it that can interface with the vehicle 102 to download and display various types of vehicle-generated information and other control data. In one embodiment, the vehicle 102 may directly communicate with the user device 112 to send and receive data without the need for the network 108 and/or the server 104.

The environment 100 may further include a network 108. The network 108 illustrates an example communication infrastructure in which the connected devices discussed in various embodiments of this disclosure may communicate. The network 108 may be and/or include the Internet, a private network, public network or other configuration that operates using any one or more known communication protocols such as, for example, transmission control protocol/Internet protocol (TCP/IP), Bluetooth®, Bluetooth® low Energy (BLE), Wi-Fi based on the Institute of Electrical and Electronics Engineers (IEEE) standard 802.11, ultra-wideband (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

The vehicle 102 may include a plurality of units including, but not limited to, an automotive computer, a Vehicle Control Unit (VCU), and a detection unit. Details of the vehicle 102 are provided below in reference to FIG. 2.

Figure 2:
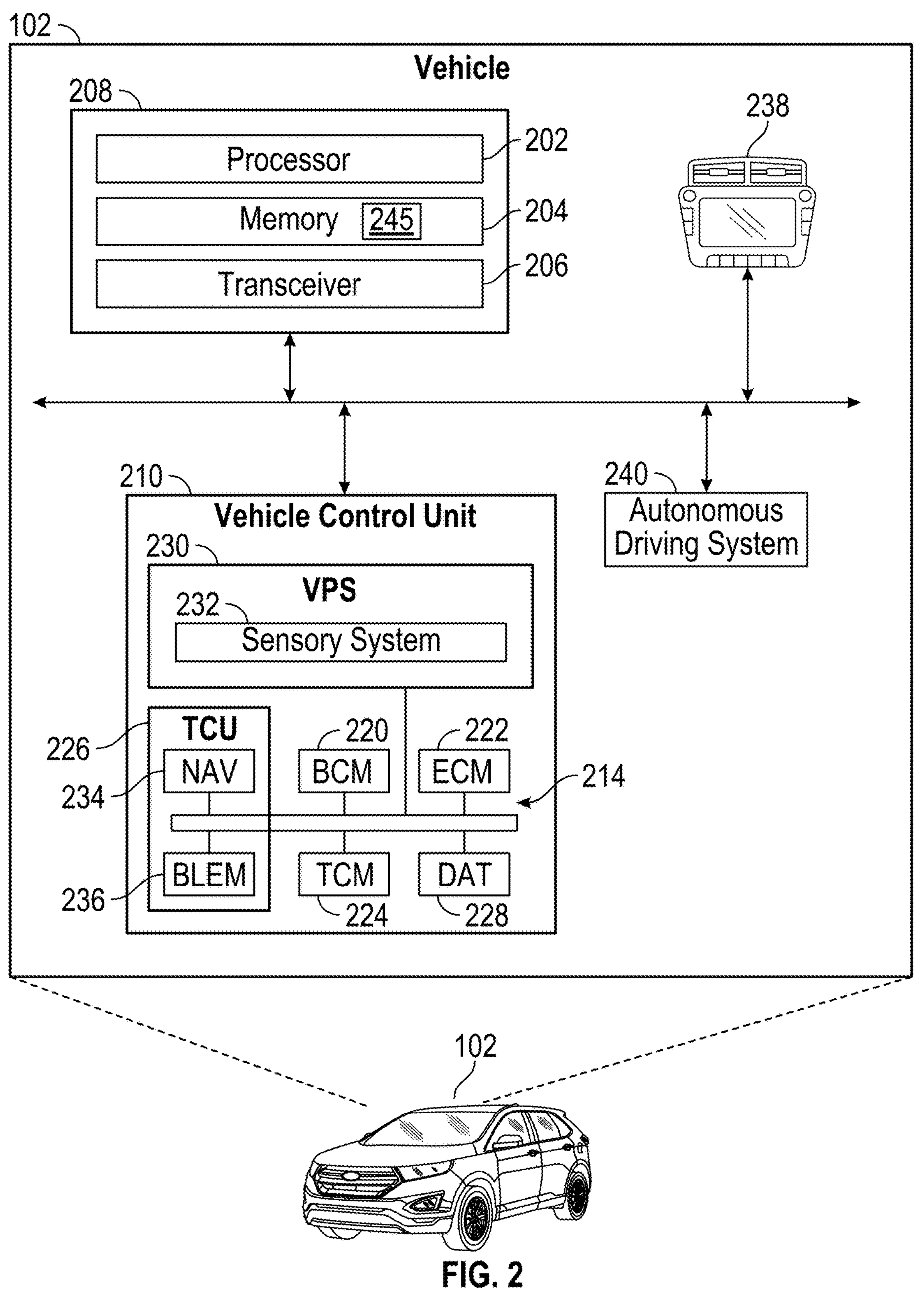
FIG. 2 illustrates a block diagram of a vehicle in accordance with one or more embodiments of the present disclosure.

FIG. 2 illustrates a block diagram of the vehicle 102 or 114 in which embodiments of the present disclosure can be implemented. The vehicle 102 or 114 may include a plurality of units including, but not limited to, an automotive computer 208, a Vehicle Control Unit (VCU) 210, and an infotainment unit 238. The VCU 210 may include a plurality of Electronic Control Units (ECUs) 214 disposed in communication with the automotive computer 208.

In some embodiments, a user device, such as a mobile phone, a laptop computer, or the like may be configured to connect with the automotive computer 208, which may communicate via one or more wireless connection(s), and/or may connect with the vehicle 102 directly by using near field communication (NFC) protocols, Bluetooth® protocols, Wi-Fi, Ultra-Wideband (UWB), and other possible data connection and sharing techniques.

The automotive computer 208 may be installed anywhere in the vehicle 102, in accordance with the disclosure. The automotive computer 208 may be or include an electronic vehicle controller, having one or more processor(s) 202, one or more memory devices 204, and one or more transceivers 206.

The processor(s) 202 may be disposed in communication with one or more memory devices disposed in communication with the respective computing systems (e.g., the memory 204 and/or one or more external databases not shown in FIG. 2). The processor(s) 202 may utilize the memory 204 to store programs in code and/or to store data for performing operations in accordance with the disclosure. The memory 204 may be a non-transitory computer-readable storage medium or memory storing a vehicle control program code. The memory 204 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.). In some embodiments, memory 204 may include a module 245 that can implement the various embodiments of the present disclosure. Module 245 may include instructions that can be executed by the processor 202 to realize the various embodiments of the present disclosure.

Automotive computer 208 may also include a transceiver 206. The transceiver 206 may be configured to receive information/inputs from one or more external devices or systems (e.g., a user device 208, an external server, and/or the like). Further, the transceiver 206 may transmit notifications, requests, signals, etc. to the external devices or systems. In addition, the transceiver 206 may be configured to receive information/inputs from vehicle components such as the vehicle sensory system 232, one or more ECUs 214, and/or the like. Further, the transceiver 206 may transmit signals (e.g., command signals) or notifications to the vehicle components such as the BCM 220, the infotainment system 238, and/or the like.

In some embodiments, the VCU 210 may share a power and/or communications bus with the automotive computer 208 and may be configured and/or programmed to coordinate the data between vehicle systems, connected servers and/or the like. The VCU 210 may include or communicate with any combination of the ECUs 214, such as, for example, the BCM 220, an Engine Control Module (ECM) 222, a Transmission Control Module (TCM) 224, a Telematics Control Unit (TCU) 226, a Driver Assistances Technologies (DAT) controller 228, etc. The VCU 210 may further include and/or communicate with a Vehicle Perception System (VPS) 230, having connectivity with and/or control of one or more vehicle sensory system(s) 232. The vehicle sensory system 232 may include one or more vehicle sensors including, but not limited to, a Radio Detection and Ranging (RADAR or "radar") sensor configured for detection and localization of objects inside and outside the vehicle 102 using radio waves, sitting area buckle sensors, sitting area sensors, a Light Detecting and Ranging ("LIDAR") sensor, door sensors, proximity sensors, temperature sensors, wheel sensors, one or more ambient weather or temperature sensors, vehicle interior and exterior cameras, steering wheel sensors, etc. The sensors that are part of the vehicle sensory system 232 may be coupled to the vehicle 102 at one or more locations and in one or more manners. For example, the various sensors of the vehicle sensory system 232 may be integrated into the various subsystems of the vehicle 102, such as doors, mirrors, roof, etc. or attached to the vehicle 102 using an appropriate mounting mechanism. In some embodiments, the various sensors of the vehicle sensory system 232 may be located at the front, back, sides, top, bottom, and underneath the vehicle 102. The location of a sensor may depend on its function. For example, a sensor that monitors the area underneath the vehicle may be connected to a bottom surface of the vehicle 102 while a sensor that can monitor an area to either side of the vehicle 102 may be mounted or integrated into the doors of the vehicle 102. Vehicle sensory system 232 may also include one or more road noise sensors such as accelerometers that are coupled to various mechanical components and/or systems of the vehicle 102. One skilled in the art will realize that the sensors may be coupled to the vehicles in various different ways and locations other than the ones mentioned above.

In some embodiments, the VCU 210 may control vehicle operational aspects and implement one or more instruction sets received from the server 104, the user device 112, or from one or more instruction sets stored in the memory 204.

The TCU 226 may be configured and/or programmed to provide vehicle connectivity to wireless computing systems onboard and off board the vehicle 102, and may include a Navigation (NAV) receiver 234 for receiving and processing a GPS signal, a BLE® Module (BLEM) 236, a Wi-Fi transceiver, a UWB transceiver, and/or other wireless transceivers (not shown in FIG. 2) that may be configurable for wireless communication (including cellular communication) between the vehicle 102 and other systems (e.g., a vehicle key fob (not shown in FIG. 2), an external server, a user device, etc.), computers, and modules. The TCU 226 may be in communication with the ECUs 214 by way of a bus. In some aspects, the TCU 226 may be configured to determine a real-time vehicle geolocation (e.g., via the NAV receiver 234).

The ECUs 214 may control aspects of vehicle operation and communication using inputs from human drivers, inputs from the automotive computer 208, and/or via wireless signal inputs received via the wireless connection(s) from other connected devices, such as the server 206, among others.

The BCM 220 generally includes integration of sensors, vehicle performance indicators, and variable reactors associated with vehicle systems, and may include processor-based power distribution circuitry that may control functions associated with the vehicle body such as lights, windows, security, camera(s), audio system(s), speakers, wipers, door locks and access control, various comfort controls, etc. The BCM 220 may also operate as a gateway for bus and network interfaces to interact with remote ECUs (not shown in FIG. 2).

The DAT controller 228 and/or the autonomous driving system 240 may provide Level-1 through Level-5 automated driving and driver assistance functionality that may include, for example, active parking assistance, vehicle backup assistance, and/or adaptive cruise control, among other features. The DAT controller 228 may also provide aspects of user and environmental inputs usable for user authentication.

In some embodiments, the automotive computer 208 may connect with an infotainment system 238 (or a vehicle Human-Machine Interface (HMI)). The infotainment system 238 may include a touchscreen interface portion, and may include voice recognition features, biometric identification capabilities that may identify users based on facial recognition, voice recognition, fingerprint identification, or other biological identification means. In other aspects, the infotainment system 238 may be further configured to receive user instructions via the touchscreen interface portion, and/or output or display notifications, navigation maps, etc. on the touchscreen interface portion.

The computing system architecture of the automotive computer 208 and/or the VCU 210 may omit certain computing modules. It should be readily understood that the computing environment depicted in FIG. 2 is an example of a possible implementation according to the present disclosure, and thus, it should not be considered as limiting or exclusive.

In addition to the components noted above, the vehicle 102 may have numerous mechanical systems and subsystems. A chassis or frame may form the backbone of the vehicle 102 and support the body and other components of the vehicle 102. The vehicle 102 may include an engine that converts fuel into mechanical power, propelling the vehicle forward. The engine includes various components such as the engine block, pistons, valves, and spark plugs. The vehicle 102 also includes a transmission system. The transmission system transfers the engine's power to the wheels. It includes the clutch, gearbox, driveshaft, and differentials, among other components. The transmission adjusts the power output to suit the vehicle's speed and load. The vehicle 102 may also include a suspension system. The suspension system absorbs shocks and maintains contact between the tires and the road, providing a smooth ride. It includes components such as springs, shock absorbers, and linkages. The vehicle 102 also includes a vehicle stopping system that allows the driver to slow down or stop the vehicle 102. It includes components like pedals, master cylinder, lines, and pads or shoes. The vehicle 102 also includes a steering system that enables the driver to guide the car. The steering system includes components such as the steering wheel, steering column, rack and pinion, and tie rods. The vehicle 102 also includes an exhaust system that removes and filters the waste gases produced by the engine. It includes the exhaust manifold, catalytic converter, muffler, and tailpipe, among other components. The vehicle 102 also includes a cooling system that prevents the engine from overheating. It includes components such as the radiator, water pump, thermostat, and coolant. The vehicle 102 also includes a cooling system that stores and supplies fuel to the engine. It includes the fuel tank, fuel pump, fuel filter, and fuel injectors. An electrical system of the vehicle 102 powers the car's electrical components. It includes the battery, alternator, starter motor, and wiring. The Heating, Ventilation, and Air Conditioning (HVAC) system controls the temperature inside the vehicle 102. It includes the heater core, blower motor, and air conditioning compressor. In some embodiments, the vehicle may be an electric vehicle (EV) or hybrid vehicle, and in either case some of the aforementioned components would be replaced by an electric motor and battery. All of the mechanical components working together ensure that the vehicle operates optimally.

The vehicle 102/114 may also have several lighting devices such as LEDs, incandescent light emitters, ultraviolet light emitters, etc. These lighting devices may be incorporated into several internal and/or external areas of the vehicle such as cluster lights, dome lights, taillights, center stack, ambient lighting, head lights, parking lights, and other exterior lights.

The presence of insects near a vehicle can affect users in many ways. For drivers, the sight of insects like bees, wasps, or spiders can cause immediate anxiety, leading to hesitation or rushed movements when entering or exiting the vehicle. For those with allergies, the presence of insects may pose a health issue, potentially leading to allergic reactions. Additionally, insects can enter the vehicle while the users are getting in or out of the vehicle, creating further discomfort and annoyance. Passengers, especially those with insect phobias, may experience heightened stress and discomfort, turning a simple journey into an unpleasant experience. Moreover, insects can ruin the vehicle's interior by leaving stains or causing unpleasant odors. The constant need to check for and deal with insects can also lead to frustration and a sense of unease, detracting from the overall driving experience.

Conventional ways of mitigating the presence of insects in and around the vehicle such as using insect repellent sprays and air-fresheners, keeping the vehicle clean, choosing a parking spot away from known insect activity, etc. are inadequate to effectively counter the insect issues. There is a need for a more robust and comprehensive approach to managing the presence of insects/bugs in and around a vehicle. Embodiments of the present disclosure provide methods and systems to mitigate presence of insects in and around the vehicle, thereby enhancing the user experience and comfort.

Using certain colored lights to repel or attract insects is known. Insects are attracted to ultraviolet (UV) light and shorter wavelengths, such as blue and violet. Yellow or amber colored lights are less attractive to insects because they emit longer wavelengths that are less visible to them. These lights can be used in and around vehicles, to create a more comfortable environment free from bugs. LED lights, which can be customized to emit specific wavelengths, are particularly useful in this regard. By choosing LED lights that emit yellow or warm white light, users can significantly reduce the number of insects drawn to their surroundings. Additionally, using insect-repellent lights can minimize insect-related annoyance or allergic reactions. However, there are currently no solutions that would allow a vehicle to intelligently control the operation of such lights in order to effectively mitigate presence of bugs. Most of current solutions are manually controlled by the user, which is often ineffective in keeping the insects at bay.

Figure 3:
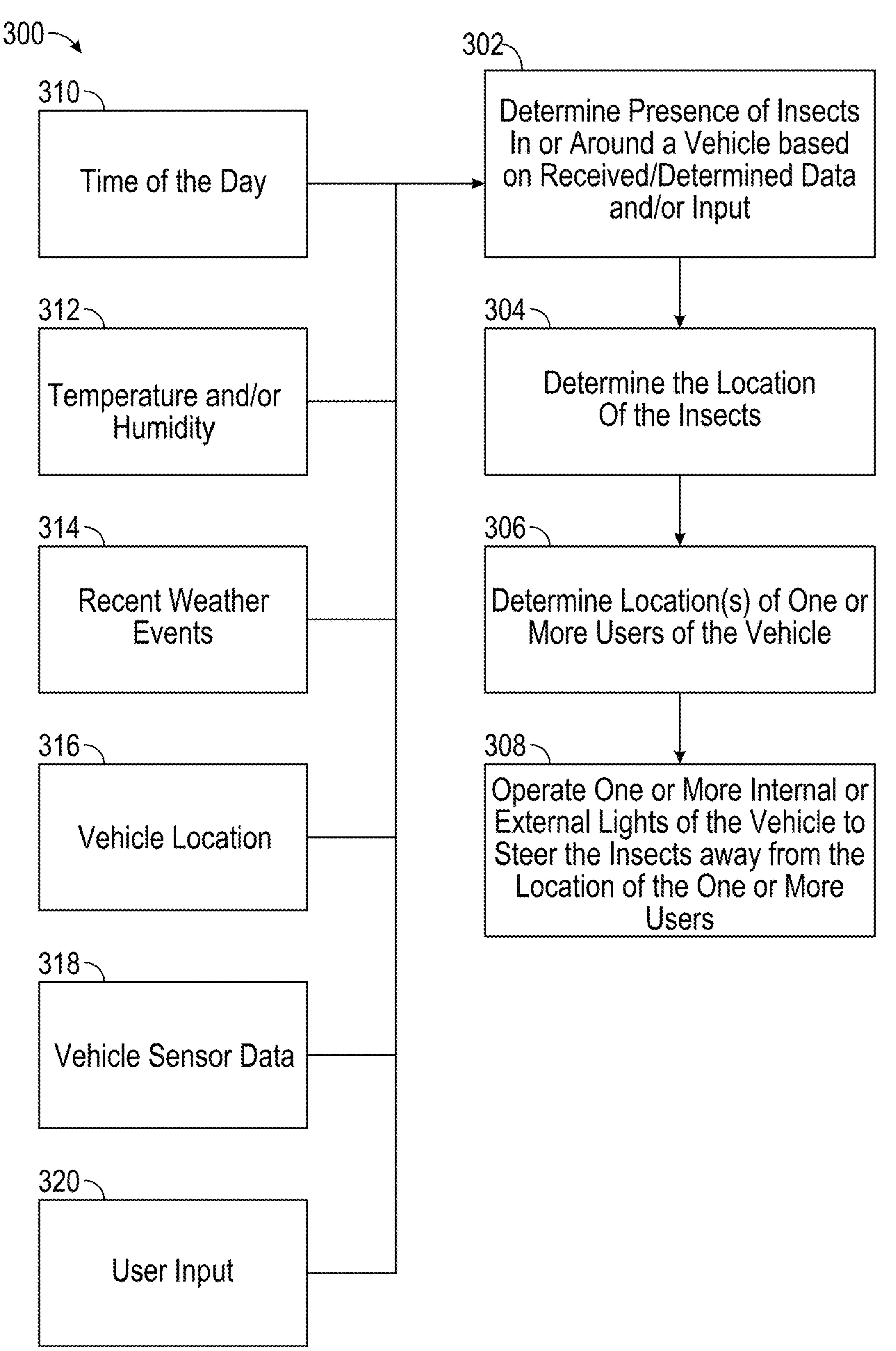
FIG. 3 illustrates a flow diagram of a process for mitigating the presence of insects in and around a vehicle in accordance with one or more embodiments of the present disclosure.

FIG. 3 illustrates a high-level flow diagram of a process 300 for mitigating presence of insects in and around a vehicle in accordance with one or more embodiments of the present disclosure. At step 302, the vehicle may determine and/or receive various types of data 310, 312, 314, 316, 318, and/or 320 and use that data to determine presence of insects in and/or around the vehicle. The vehicle may determine the time of the day information 310. For example, presence of insects may be more pronounced during the twilight/night hours compared to noon or certain types of insects may be more active during the day (e.g., diurnal insects like butterflies, bees, dragonflies, etc.) while other types of insects may be more active during the night (e.g., nocturnal insects like moths, beetles, certain species of mosquitoes, etc.). Thus, the time of the day may help in determining which types of insects are likely to be present in the vicinity of the vehicle. Temperature and/or humidity data 312 may also provide valuable information for determining the type and likelihood of the number of insects present in the vicinity of the vehicle. For example, temperature fluctuations throughout the day influence insect activity. Cooler temperatures can be more suitable for some insects, while others thrive in warmer environments. Similarly, humidity levels can also affect insect presence. Some insects prefer higher humidity levels, while others are more active during drier conditions. Recent weather event data 314 can also inform about the likelihood of presence of insects. For example, if it has rained in the area recently, it is more likely that insect activity may be at a higher level than if the area has been dry for a prolonged period. Current vehicle location data 316 can inform the vehicle of general insect activity in the area. For example, if the vehicle is currently located in a tropical environment, it is likely that there is increased insect presence as it is historically known that tropical environments attract more insects. Data 318 captured using the various sensors of the vehicle can be processed to determine whether there are any insects in and around the vehicle. The details of determining presence of insects based on image data captured by the vehicle are explained below with reference to FIG. 4. In addition to visual image data, other types of data such as Infrared sensor data, acoustic sensor data, optical sensor data, Radar and LIDAR data, thermal infrared imaging data, and/or chemiluminescent tags may be used by the vehicle to detect and track insect movements. In some instances, the user may provide an input 320 (e.g., via the HMI system of the vehicle) notifying the vehicle about the presence of insects in or around the vehicle. For instance, the user input may be textual, verbal, or non-verbal such as a gesture. In some instances, the vehicle may execute step 308 solely based on user input data 320 and without performing any of the other steps in the process 300.

Once the vehicle has determined that insects are present in or around the vehicle, the vehicle may then determine the location of the insects at step 304. The location of the insects may be determined at a higher level such as whether the insects are inside or outside of the vehicle. In other instances, the determination of the insect location may be more precise such as front left of the vehicle, or back of the vehicle, etc. The location of the insects may be determined using the same data that is used to detect the presence of insects at step 302. Once the location data of the insects is determined, the vehicle may then determine the location of the users of the vehicle, at step 306. The location of the users may be determined using various types of data including images captured by one or more of the vehicle sensors, geo-location of the user device 112, Wi-Fi triangulation data associated with user device, location of the key fob associated with the vehicle, Bluetooth data, etc. It is to be noted that the user(s) may be located inside or outside of the vehicle. The user location determination step 306 can determine the precise location of the user and whether the user is located inside or outside of the vehicle. This is important since the mitigation technique deployed by the vehicle will be partially based on the location of the users. Once the location of the insects and the location of the users are determined, the vehicle may then employ one or more mitigation techniques based on that information, at step 308. One of the mitigation techniques may be operating internal and/or external lights of the vehicle to either attract or repel the insects. In an embodiment, the vehicle may operate the internal and/or external lights of the vehicle in a manner to steer the insects away from the location of the users.

In some embodiments, the vehicle may automatically perform the process 300 without any user intervention. In other embodiments, the vehicle may receive an input from a user of the vehicle. For example, a user of the vehicle may interact with the HMI system of the vehicle and select a "bug free" mode or some other similar feature that triggers the vehicle to perform the process 300 above. In other embodiments, the user may provide verbal or gesture input to the vehicle, and the vehicle may then perform the process 300 based on that input. In other instances, the vehicle may determine whether to perform the process 300 based on the motion state of the vehicle. For example, it may be beneficial to perform the insect mitigation while the vehicle is parked or otherwise stationary. At or above a certain speed, the insect mitigation process may not be needed as it is uncommon for insects to be in the vicinity of a vehicle when the vehicle is travelling above a certain speed.

In some embodiments, where the vehicle is being used as part of an outdoor activity like camping or tailgating, the vehicle may determine that it is likely that insects would pose an issue due to the nature and location of the activity. In this instance, the vehicle may automatically configure itself to emit light having a wavelength that is least attractive to the various insects. Thus, if the users of the vehicle turn on any of the lights of the vehicle, the emitted light is such that it is least attractive to the insects. In some embodiments, based on the current location of the vehicle, the vehicle may receive or determine data about the most common insects found in that geographic area and determine the most appropriate light wavelength to emit based on the type of insects. Thus, the vehicle can tailor its light emissions based on the type of insects found in any particular geographic area.

Figure 4:
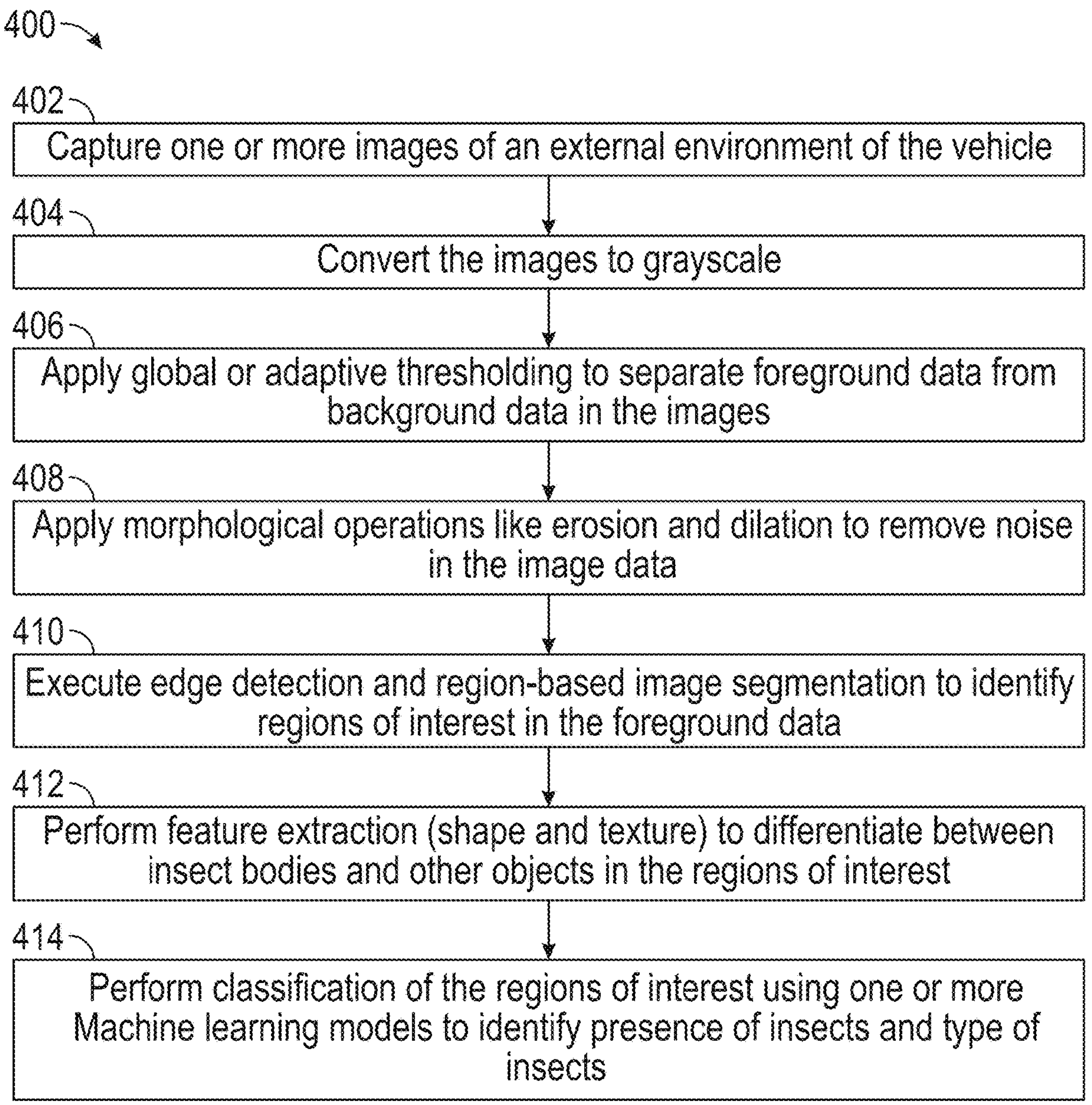
FIG. 4 illustrates a process for detecting the presence of insects based on images captured by the vehicle.

FIG. 4 illustrates a process 400 for detecting the presence of insects based on images captured by the vehicle. Process 400 may be performed by the vehicle 102/114 and/or the server 104 in conjunction with the vehicle 102/114.

At step 402, the vehicle may capture one or more images of the internal cabin of the vehicle and/or an external environment of the vehicle using one or more image sensors of the vehicle sensory system 232. At step 404, the captured image(s) are converted to grayscale. In addition, noise filters such as Gaussian blur may be applied to the images to reduce noise and enhance the quality of the images. At step 406, the images may be subjected to global or adaptive thresholding to separate the foreground (e.g., potential insects) from the background. For example, if global thresholding is used, the vehicle may compute a histogram of the grayscale image. The histogram represents the frequency of each intensity level in the image. Thereafter, a probability distribution of each intensity level may be calculated by dividing the histogram values by the total number of pixels in the image. Then, for each possible threshold value, the probabilities of the two classes (background and foreground) are calculated and then the means of the two classes are computed. Thereafter, the within-class variance for each threshold is calculated. Once that is done, the vehicle may then find the threshold (t) that minimizes the within-class variance. This threshold is the optimal value that best separates the foreground and background. The optimal threshold is used to binarize the image, setting all pixels below the threshold to one value (e.g., 0) and all pixels above the threshold to another value (e.g., 255). This effectively segments the image and prepares it for further processing.

Unlike global thresholding, which uses a single threshold value for the entire image, adaptive thresholding calculates the threshold for smaller regions of the image, allowing for more accurate segmentation. For example, the threshold value is computed for each pixel based on the pixel values in its local neighborhood. This helps in handling variations in lighting and shadows within different parts of the image. The common methods used for adaptive thresholding include mean adaptive thresholding or Gaussian adaptive thresholding.

At step 408, the image data may be subjected to one or more morphological operations such as erosion or dilation. Erosion is a process that removes pixels on object boundaries. The basic idea is to erode the boundaries of the foreground object. It is useful for removing small white noises, separating two connected objects, and shrinking the size of objects. This operation causes the boundaries of the object to shrink, making the object smaller and removing small, irrelevant details. Dilation is the opposite of erosion. It adds pixels to the boundaries of objects in an image. This operation is useful for joining broken parts of an object, filling small holes, and increasing the size of objects. This operation causes the boundaries of the object to expand, making the object larger and filling in small holes and gaps. These morphological operations help in refining the segmented regions.

At step 410, the image data is then subjected to edge detection and region-based image segmentation to identify regions of interest within the image. Edge detection helps with identifying and extracting the boundaries and contours of potential insects in the image. In an example, canny edge detector and/or contour edge detection algorithms may be used. The region-based image segmentation may be performed using the watershed algorithm. At step 412, feature extraction may be performed on the image data to identify the insects in the regions of interest. The feature extraction may include extraction of shape features (e.g., area, perimeter, and aspect ratio) and texture features to differentiate between insect bodies and other objects in the regions of interest. Once the insect bodies are identified, the image data can then be classified using one or more machine learning models to identify the type and approximate number of insects in the regions of interest, at step 414. For example, trained models such as Support Vector Machines (SVM), Convolutional Neural Networks (CNN), or other deep learning models such as faster R-CNN may be used. Once the type and approximate number of insects are identified, the appropriate mitigation technique may be used.

The mitigation techniques used for minimizing the presence of insects in and around the vehicle may include different techniques based on the location of the insects, the location of the users, and/or location of the vehicle. The location of the insects can be broadly classified as either being inside the vehicle or being outside the vehicle. Similarly, the location of the users or occupants of the vehicle may also be broadly classified as being inside or outside the vehicle.

In one embodiment, the insects may be located inside the vehicle and the users may also be located inside the vehicle. In this instance, the vehicle may automatically turn off the interior lights of the vehicle and turn on one or more exterior lights of the vehicle (e.g., turn signal, taillights, door lights, etc.). The exterior lights of the vehicle may emit light having a wavelength between 400 nm and 500 nm and/or light in the ultraviolet wavelength/spectrum. In addition, the vehicle may also open one or more windows of the vehicle to allow the insects to exit the vehicle. In one embodiment, the vehicle may manipulate the color of the exterior lights to a color that is attractive to the insects. This results in the insects being drawn towards the exterior light. Once all or most of the insects have exited the vehicle, the users can then close the vehicle windows and doors, thus making the inside of the vehicle substantially insect free. In another embodiment, instead of turning off the interior lights of the vehicle, the vehicle may manipulate the interior lights to emit light of a wavelength that is not preferred by the insects (e.g., light having a wavelength above 600 nm). This will have a "push-pull" effect on the insects such that the insects are pushed or repelled out of the vehicle by the interior lights and the insects are pulled or attracted towards the exterior lights. In this instance, the interior light may be manipulated in a way that does not interfere with the driver of the vehicle if the vehicle is in motion during this operation. In some embodiments, the interior insect repellent lights of the vehicle may only be illuminated when the vehicle is stationary.

Figure 5A:
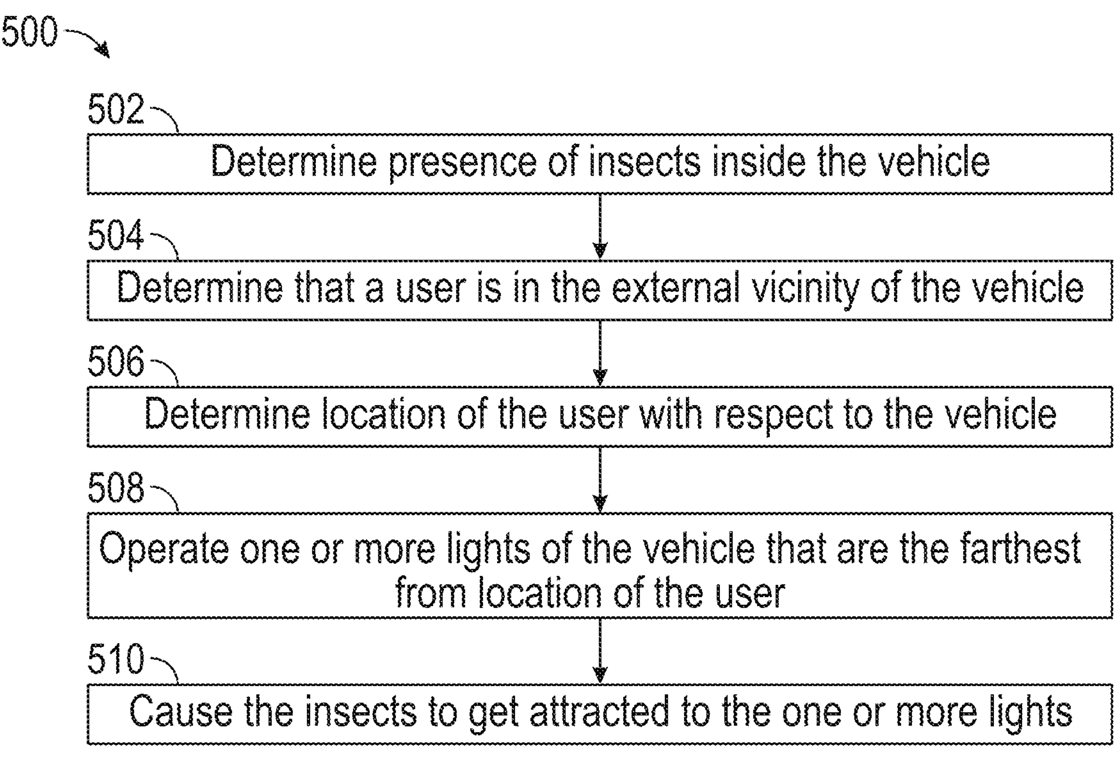
FIG. 5A illustrates a process for intelligent operation of vehicle lights in order to mitigate the presence of insects in accordance with one or more embodiments of the present disclosure.

In another embodiment, the vehicle may determine that the insects are located inside the vehicle while the users are located outside the vehicle. FIG. 5A illustrates a process 500 for intelligent operation of vehicle lights in order to mitigate presence of insects in accordance with this embodiment of the present disclosure. Process 500 may be performed solely by the vehicle (e.g., vehicle 102) and/or in conjunction with the server 104. At step 502, the vehicle may determine presence of insects within the vehicle (e.g., using any of the techniques disclosed above). The vehicle may also determine presence of a user in an external environment of the vehicle at step 504. In this instance, the user who may be standing next to the vehicle may intend to enter the vehicle. It would be beneficial if the insects located inside the vehicle are repelled out of the vehicle so that the user may enter the vehicle. The vehicle may further determine the location of the user with respect to the vehicle, for instance, whether the user is located near the driver door side of the vehicle or near one of the back passenger doors of the vehicle, at step 506. Based on the location of the user, the vehicle may then turn on one or more of the appropriate external lights of the vehicle at step 508. For instance, the vehicle may turn on an external light that is farthest from the location of the user. In one embodiment, if the vehicle determines that the user is located near the driver side door of the vehicle, the vehicle may turn on one or more taillights to emit light that attracts the insects towards it. This may cause the insects to travel towards the taillights of the vehicle at step 510, thereby vacating the inside of the vehicle. The user may then enter the vehicle without having to worry about the presence of insects in the vehicle.

Figure 5B:
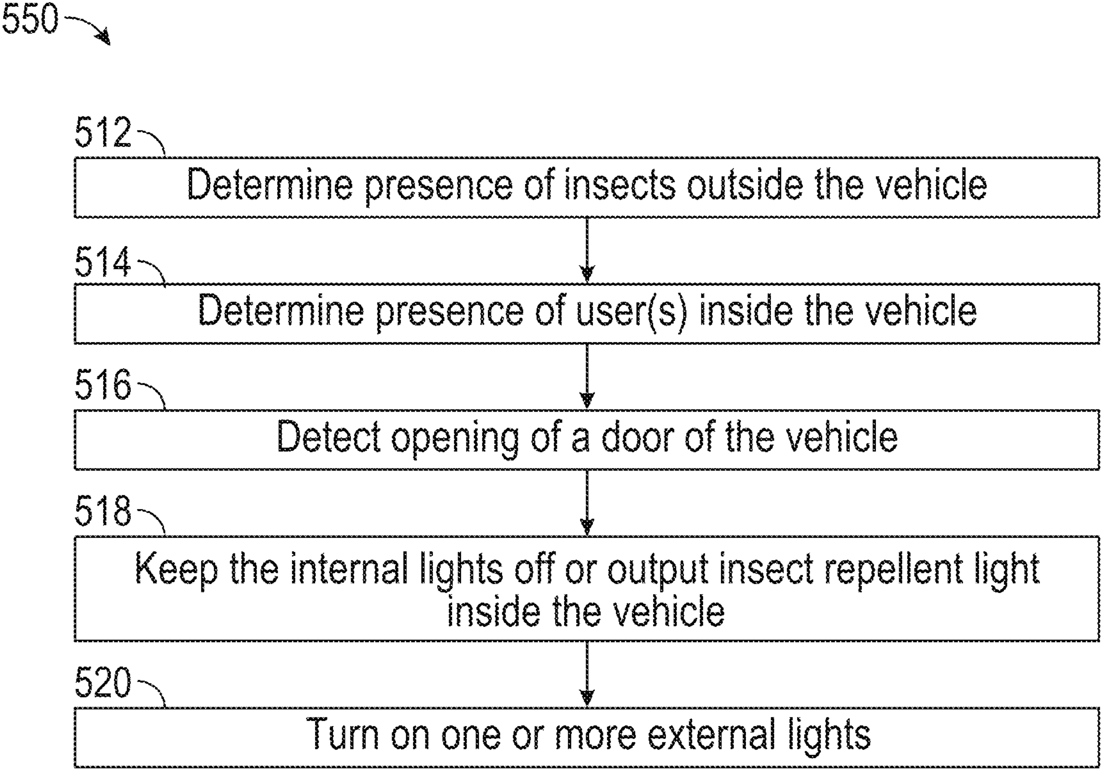
FIG. 5B illustrates a process for mitigating the presence of insects in or around the vehicle in accordance with one or more embodiments of the present disclosure.

FIG. 5B is a flow diagram of a process 550 for mitigating the presence of insects in or around the vehicle in accordance with an embodiment of the present disclosure. Process 550 may be performed solely by the vehicle (e.g., vehicle 102) and/or in conjunction with the server 104. At step 512, the vehicle may determine presence of insects outside the vehicle. The vehicle may also determine the presence of one or more users inside the vehicle at step 514. In this instance, the user(s) may intend to exit the vehicle and may want to prevent the insects from entering the vehicle. The vehicle may detect opening of one or more doors of the vehicle at step 516. Based on that, the vehicle may conclude that the user(s) may want to exit the vehicle. Normally, when a vehicle door is opened, the internal light (e.g., dome light) of the vehicle is illuminated to guide the user out of the vehicle. However, in this instance, the vehicle may keep the internal light off, at step 518, in order to not attract the insects to travel inside the vehicle. In another embodiment, the vehicle may illuminate the internal lights with a light that repels insects to prevent the insects from entering the vehicle. At step 520, the vehicle may turn on one or more external lights of the vehicle to attract the insects towards the external lights. This will cause the insects to travel towards the external lights and now the user(s) can exit the vehicle without worrying about the insects entering the vehicle.

Figure 6:
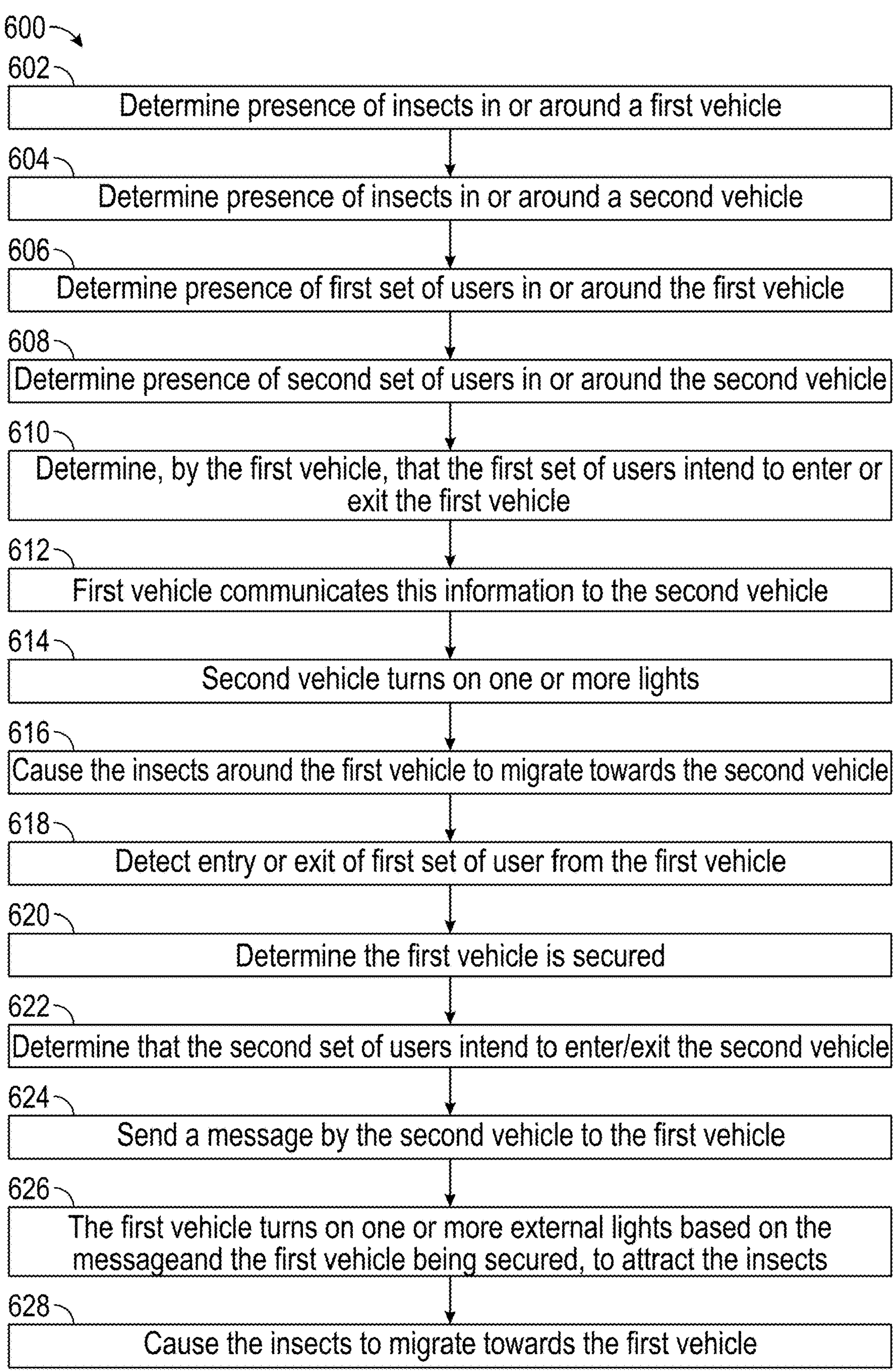
FIG. 6 illustrates a process for mitigating the presence of insects in accordance with one or more embodiments of the present disclosure.

In some embodiments, two or more vehicles may communicate with each other in order to mitigate presence of insects and enhance user experience for users exiting and/or entering the vehicles. FIG. 6 illustrates a process 600 for mitigating presence of insects according to yet another embodiment of the present disclosure. Process 600 may be performed by two or more vehicles that are in communication with each other (e.g., using V-2-V communication and/or via server 104).

For instance, consider that two vehicles are located in proximity to each other, such as in a parking lot. The first vehicle is associated with a first set of one or more users and the second vehicle is associated with a second set of one or more users. Further consider that the first set of users either intend to exit the first vehicle or enter the first vehicle. Similarly, the second set of users either intend to enter the second vehicle or exit the second vehicle. At step 602, the first vehicle may determine the presence of insects in or around the first vehicle (e.g., using any of the techniques described above). At step 604, the second vehicle may also detect presence of insects in or around the second vehicle. At step 606, the first vehicle may detect presence of the first set of users within the first vehicle who intend to exit the first vehicle or around the first vehicle who intend to enter the first vehicle. In either of these situations, presence of insects either inside and/or outside of the first vehicle may have to be mitigated in order for the first set of users to enter or exit the first vehicle. At step 608, the second vehicle may detect presence of the second set of users in or around the second vehicle—although this is not necessary for the basic embodiment to work.

At step 610, the first vehicle may determine that the first set of users intend to either exit or enter the first vehicle. In an embodiment, operation of a door of the first vehicle may be used to determine the intention of the first set of users. After the first vehicle determines that the first set of users intend to enter or exit the first vehicle, the first vehicle may send a message to the second vehicle, providing the second vehicle with this information and information about the presence of insects in or around the first vehicle, at step 612. After the second vehicle receives this information from the first vehicle, the second vehicle may turn on one or more of its external lights at step 614. The second vehicle may manipulate its external lights to emit light having a wavelength that attracts the insects. This will cause the insects present in or around the first vehicle to migrate towards the second vehicle, at step 616, thereby reducing or eliminating the presence of insects in or around the first vehicle. The first set of users may now enter or exit the first vehicle without having to worry about insects either getting inside the first vehicle or remaining inside the first vehicle.

At step 618, the first vehicle may detect entry into or exit from the first vehicle of the first set of users. At step 620, the first vehicle may determine that the first vehicle is secure after the entry or exit of the first set of users. For example, the doors of the first vehicle are closed and all the windows or other panels of the first vehicle are closed such that insects cannot enter the first vehicle. In some embodiments, the first vehicle may detect that the first set of users have entered the first vehicle and based on that send a second message to the second vehicle. The second vehicle may then turn off its external lights. At step 622, the second vehicle may determine that the second set of users intend to either enter or exit the second vehicle. Since the second vehicle has detected presence of insects at step 604, it may be beneficial to get rid of those insects before the second set of users enter or exit the second vehicle. In order to accomplish this, the second vehicle may send a message to the first vehicle that that the second set of users intend to enter or exit the second vehicle, at step 624. Upon receiving that message and ensuring that the first vehicle is secure, the first vehicle may turn on one or more of its external lights, at step 626, in a manner to attract the insects from the second vehicle to the first vehicle. This may cause the insects to migrate from the second vehicle to the first vehicle at step 628. Once the insects have migrated from the second vehicle to the first vehicle, the second set of users may now enter or exit the second vehicle without worrying about the insects. Since the first vehicle is secure, there is no possibility of the insects entering the first vehicle. In this manner, two or more vehicles may cooperate to steer away the insects from a specific vehicle so that users of the other vehicle may enter or exit the vehicle without having to confront the insects. It is to be noted that it is not necessary in the above scenario that the second vehicle also has users that want to enter or exit the second vehicle. The second vehicle may simply assist the first vehicle to attract the insects so that the first set of users is able to enter or exit the first vehicle.

Figure 7:
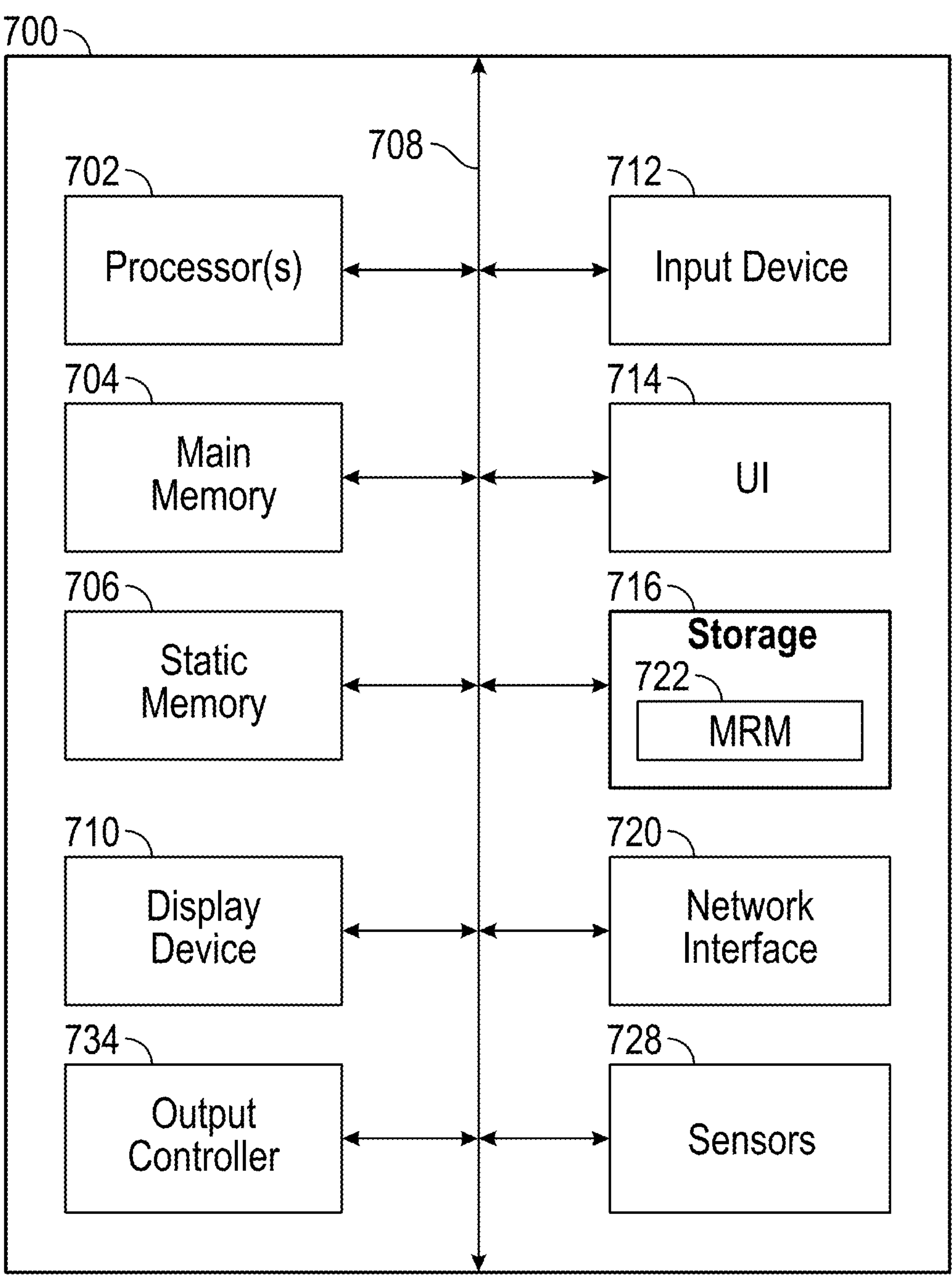
FIG. 7 depicts a block diagram of an example control server in accordance with one or more embodiments of the present disclosure.

FIG. 7 depicts a block diagram of an example control server 700, (e.g., control server 104 of FIG. 1) upon which any of one or more techniques (e.g., methods) may be performed or which may perform the methods described above in conjunction with the vehicle 102, in accordance with one or more example embodiments of the present disclosure. In other embodiments, the server 700 may operate as a standalone device or may be connected (e.g., networked) to other servers. In a networked deployment, the server 700 may operate in the capacity of a server machine, a client machine, or both in server-client network environments. In an example, the server 700 may act as a peer server in peer-to-peer (P2P) (or other distributed) network environments. The server 700 may be a personal computer (PC), a tablet PC, a set-top box (STB), a personal digital assistant (PDA), a mobile telephone, a smart key fob, a wearable computer device, a web appliance, a network router, a switch or bridge, or any machine capable of executing instructions (sequential or otherwise) that specify actions to be taken by that server, such as a base station. Further, while only a single server is illustrated, the term "server" shall also be taken to include any collection of servers that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific task when in operation. The configuring may occur under the direction of the execution units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The server (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The server 700 may further include a graphics display device 710, an alphanumeric input device 712 (e.g., a keyboard), and a user interface (UI) navigation device 714 (e.g., a mouse). In an example, the graphics display device 710, alphanumeric input device 712, and UI navigation device 714 may be a touch screen display. The server 700 may additionally include a storage device (e.g., drive unit) 716, a network interface device/transceiver 720 coupled to antenna(s), and one or more sensors 728, such as a global positioning system (GPS) sensor, a compass, an accelerometer, or other sensor. The server 700 may include an output controller 734, such as a serial (e.g., universal serial bus (USB)), parallel, or other wired or wireless (e.g., infrared (IR)), near field communication (NFC), etc. connection to communicate with or control one or more peripheral devices (e.g., a printer, a card reader, etc.).

The storage device 716 may include a machine readable medium 722 on which is stored one or more sets of data structures or instructions (e.g., software) embodying or utilized by any one or more of the techniques or functions described herein. The instructions may also reside, completely or at least partially, within the main memory 704, within the static memory 706, or within the hardware processor 702 during execution thereof by the server 700. In an example, one or any combination of the hardware processor 702, the main memory 704, the static memory 706, or the storage device 716 may constitute machine-readable media.

While the machine-readable medium 722 is illustrated as a single medium, the term "machine-readable medium" may include a single medium or multiple media (e.g., a centralized or distributed database, and/or associated caches and servers) configured to store the one or more instructions.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the server 700 and that cause the server 700 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions may further be transmitted or received over a communications network using a transmission medium via the network interface device/transceiver 720 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 720 may include one or more physical jacks (e.g., Ethernet, coaxial, or phone jacks) or one or more antennas to connect to the communications network. In an example, the network interface device/transceiver 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the server 700 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

It is to be noted that the vehicle implements and/or performs operations, as described here in the present disclosure, in accordance with the owner manual and safety guidelines. In addition, any action taken by the vehicle owner/driver based on recommendations or notifications provided by the vehicle should comply with all the rules specific to the location and operation of the vehicle (e.g., Federal, state, country, city, etc.). The recommendation or notifications, as provided by the vehicle, should be treated as suggestions and only followed according to any rules specific to the location and operation of the vehicle. In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:

capturing, by a vehicle, an image using an image sensor of the vehicle;

generating, by the vehicle and using the image, foreground image data and background image data;

executing, by the vehicle, a morphological operation on the image to remove noise from the image;

executing, by the vehicle and on the foreground image data and the background image data, feature extraction to identify one or more insects depicted in the image;

determining, by the vehicle, a first location of the one or more insects with respect to the vehicle;

identifying, by the vehicle, presence of one or more users in a vicinity of the vehicle;

determining, by the vehicle, a second location of the one or more users with respect to the vehicle based at least in part on a second image captured using the image sensor, a geo-location of a user device, or a location of a key fob associated with the vehicle; and operating, by the vehicle, a set of lights based on the first location of the one or more insects and the second location of the one or more users.

2. The method of claim 1, wherein the first location of the one or more insects is in an external environment of the vehicle and operating the set of lights comprises operating, by the vehicle, a first set of lights that are disposed on one or more external surfaces of the vehicle.

3. The method of claim 1, wherein the first location of the insects is within the vehicle and operating the set of lights comprises operating, by the vehicle, a first set of lights that are disposed inside the vehicle.

4. The method of claim 1, wherein operating the set of lights based on the first location of the one or more insects and the second location of the one or more users comprises:

determining a first set of lights, from the set of lights, that are disposed within the vehicle; and turning on the first set of lights.

5. The method of claim 1, wherein operating the set of lights based on the first location of the one or more insects and the second location of the one or more users comprises:

determining a first set of lights, from the set of lights, that are disposed on one or more external surfaces of the vehicle and located farthest from the second location; and turning on the first set of lights.

6. The method of claim 5, wherein the first set of lights emit a light having a wavelength of between 400 nm and 500 nm.

7. The method of claim 1, wherein the first location is inside the vehicle, and wherein the second location is inside the vehicle, the method further comprising:

illuminating, by the vehicle, a lighting device inside the vehicle, wherein the lighting device is part of the set of lights and emits light having a wavelength of greater than 600 nm.

8. The method of claim 1, wherein determining the second location of the one or more users with respect to the vehicle is based on the second image.

9. The method of claim 1, wherein determining the second location of the one or more users with respect to the vehicle is based on the geo-location of the user device.

10. The method of claim 1, wherein determining the second location of the one or more users with respect to the vehicle is based on the location of the key fob associated with the vehicle.

11. A vehicle comprising:

one or more processors;

one or more memory devices storing instructions and coupled to the one or more processors; and one or more sensors coupled to the one or more processors, wherein the one or more processors are configured to execute the instructions to:

capture image data using the one or more sensors;

generate, using the image data, foreground image data and background image data;

execute a morphological operation on the image data to remove noise from the image data;

execute, on the foreground image data and the background image data, feature extraction to identify one or more insects depicted in the image data;

determine a first location of the one or more insects with respect to the vehicle;

identify presence of one or more users in a vicinity of the vehicle;

determine a second location of the one or more users with respect to the vehicle based at least in part on a second image captured using the image sensor, a geo-location of a user device, or a location of a key fob associated with the vehicle; and operate a set of lights of the vehicle based on the first location of the one or more insects and the second location of the one or more users.

12. The vehicle of claim 11, wherein to operate the set of lights, the one or more processors are further configured to execute the instructions to:

determine a first set of lights, from the set of lights, that are disposed within the vehicle; and turn on the first set of lights.

13. The vehicle of claim 11, wherein to operate the set of lights, the one or more processors are further configured to execute the instructions to:

determine a first set of lights, from the set of lights, that are (i) disposed on one or more external surfaces of the vehicle and (ii) located farthest from the second location; and turn on the first set of lights.

14. The vehicle of claim 11, wherein the first location is inside the vehicle, wherein the second location is inside the vehicle, and the one or more processors are further configured to execute the instructions to:

illuminate a lighting device inside the vehicle, wherein the lighting device emits light having a wavelength of greater than 600 nm and is part of the set of lights.

15. The vehicle of claim 11, wherein the first location of the one or more insects is in an external environment of the vehicle, and wherein to operate the set of lights, the one or more processors are further configured to execute the instructions to: operate a first set of lights that are disposed on one or more external surfaces of the vehicle.

16. The vehicle of claim 11, wherein the first location of the one or more insects is inside the vehicle, and wherein to operate the set of lights, the one or more processors are further configured to execute the instructions to: operate a first set of lights that are disposed inside the vehicle.

17. The vehicle of claim 11, wherein the set of lights emit light having a wavelength of between 400 nm and 500 nm or above 600 nm.

18. The vehicle of claim 11, wherein determining the second location of the one or more users with respect to the vehicle is based on the second image.

19. The vehicle of claim 11, wherein determining the second location of the one or more users with respect to the vehicle is based on the geo-location of the user device.

20. The vehicle of claim 11, wherein determining the second location of the one or more users with respect to the vehicle is based on the location of the key fob associated with the vehicle.

* * * * *